(12) United States Patent
Armstrong

(10) Patent No.: US 7,654,219 B2
(45) Date of Patent: Feb. 2, 2010

(54) SIGHT GLASSES AND PIPES INCORPORATING THE SAME

(76) Inventor: William Armstrong, 5821 Liberty Rd. South, Salem, OR (US) 97306

( * ) Notice: Subject to any disclaimer, the term of this patent is extended or adjusted under 35 U.S.C. 154(b) by 42 days.

(21) Appl. No.: 11/860,913

(22) Filed: Sep. 25, 2007

(65) Prior Publication Data

US 2008/0080080 A1    Apr. 3, 2008

Related U.S. Application Data

(60) Provisional application No. 60/848,786, filed on Oct. 2, 2006.

(51) Int. Cl.
*F16L 55/00* (2006.01)
*G01F 23/02* (2006.01)
(52) U.S. Cl. .................. 116/276; 73/323
(58) Field of Classification Search .......... 116/276; 73/323, 325, 326, 328, 330, 334; 137/551, 137/559; 359/384
See application file for complete search history.

(56) References Cited

U.S. PATENT DOCUMENTS

| 1,042,730 | A | | 10/1912 | Walquist | |
|---|---|---|---|---|---|
| 1,886,444 | A | | 11/1932 | Wurster | |
| 3,745,967 | A | * | 7/1973 | Smith et al. | 116/275 |
| 3,886,796 | A | * | 6/1975 | Gruett | 73/328 |
| 3,951,301 | A | * | 4/1976 | Meginnis | 220/328 |
| 4,178,669 | A | | 12/1979 | Hara et al. | |
| 4,807,473 | A | | 2/1989 | Jackson | |
| 4,888,990 | A | | 12/1989 | Bryan et al. | |
| 4,981,040 | A | * | 1/1991 | Lin | 73/323 |
| 5,125,269 | A | | 6/1992 | Horst, Jr. | |
| 5,243,929 | A | * | 9/1993 | Brown et al. | 116/276 |
| 5,628,231 | A | | 5/1997 | Sheridan | |
| 6,116,274 | A | | 9/2000 | Ehrlich | |
| 2009/0229686 | A1 | * | 9/2009 | Fahl | 137/559 |

OTHER PUBLICATIONS

Feb. 26, 2008 International Search Report; International Application No. PCT/US07/20958.
Seneca Tank, Truck Tank & Transport Parts & Equipment Catalog, pp. 1, 4, Des Moines, Iowa.

* cited by examiner

*Primary Examiner*—R. A. Smith
(74) *Attorney, Agent, or Firm*—Kolisch Hartwell, PC.

(57) ABSTRACT

Sight glass assemblies, pipe assemblies including the same, and methods for assembling pipe assemblies are disclosed. Sight glass assemblies may include an annular body of a transparent material. The annular body may include a peripheral surface, an interior surface defining at least a portion of a fluid path, first and second parallel planar annular surfaces spaced a first distance apart, and at least one passage extending through the annular body from the first planar annular surface to the second planar annular surface between the peripheral and interior surfaces. In some examples, a sight glass assembly may include at least one spacing element, which may include first and second bearing surfaces. The first and second bearing surfaces may be spaced a second distance at least as large as the first distance. In some examples, the interior surface may be chemically resistant to at least one predetermined fluid.

24 Claims, 2 Drawing Sheets

SIGHT GLASSES AND PIPES INCORPORATING THE SAME

This application claims priority to U.S. Provisional Patent Application Ser. No. 60/848,786, which was filed on Oct. 2, 2006. The complete disclosure of the above-identified patent application is hereby incorporated by reference for all purposes.

FIELD OF THE DISCLOSURE

The present disclosure relates generally to sight glasses, and, more particularly, to sight glasses used in material transport pipes and methods of assembling the same.

BACKGROUND

Liquids, such as petroleum or other fuels are often transported in metal tanks and/or through metal pipes. For example, petroleum fuels may be transported in metal tanker trucks and transferred to and/or from other tanks through a suitable passage or tube such as a pipe or hose. The use of tubes fabricated from opaque materials, such as metals or rubbers, often precludes direct observation of the flow and/or type of fluid through the tube. Inclusion of a transparent region in the tube may permit a direct observation of fluid flow through the tube. Further, in the case of fuels, the type of which may sometimes be distinguished by color, such a transparent region in the tube may permit a direct observation of the type and/or color of the fuel present in and/or flowing through the tube.

Examples of sight glasses and pipes incorporating the same are disclosed in U.S. Pat. Nos. 5,125,269; 5,628,231; 4,888,990; 1,886,444; and 1,042,730. The disclosures of these and all other publications referenced herein are incorporated by reference in their entirety for all purposes.

SUMMARY OF THE DISCLOSURE

In some examples, a sight glass assembly may include an annular body of a transparent material and at least one spacing element. The annular body may include a peripheral surface, an interior surface defining at least a portion of a fluid path, a first planar annular surface, a second planar annular surface parallel to and spaced a first distance from the first planar annular surface, and at least one passage extending through the annular body. The at least one passage may extend from the first planar annular surface to the second planar annular surface. At least a part of the at least one passage may be disposed between the peripheral surface and the interior surface. The at least one spacing element may be disposed in the at least one passage. The at least one spacing element may extend along the passage from a first bearing surface to a second bearing surface. The first bearing surface may be spaced a second distance from the second bearing surface, and the second distance may be at least as large as the first distance.

In some examples, a sight glass assembly for a fluid transport tube may include a solid annular body of a transparent material. The annular body may include first and second parallel planar annular surfaces, a peripheral surface, an interior surface, and a plurality of holes extending through the annular body. The interior surface may extend from the first planar annular surface to the second planar annular surface. The interior surface may define at least a first portion of the fluid transport tube. The interior surface may be chemically resistant to at least one predetermined fluid. The plurality of holes may extend between the peripheral and interior surfaces and from the first planar annular surface to the second planar annular surface.

In some examples, a pipe assembly may include a first pipe section having a first mounting flange, a second pipe section having a second mounting flange, a ring-shaped body of a transparent material disposed between the first and second mounting flanges, a plurality of spacing elements, and a plurality of fastening elements. The ring-shaped body may include first and second annular surfaces and a plurality of holes extending through the ring-shaped body. The second annular surface may be parallel to and spaced a first distance from the first annular surface. The plurality of holes may extend through the ring-shaped body from the first annular surface to the second annular surface and parallel to a longitudinal axis of the ring-shaped body. The plurality of spacing elements may be disposed in at least some of the plurality of holes. Each of the plurality of spacing elements may include a first bearing surface and a second bearing surface parallel to and spaced a second distance from the first bearing surface. The second distance may be at least as large as the first distance. The plurality of fastening elements may pass through at least some of the plurality of holes and may secure the first and second mounting flanges proximate respective ones of the first and second annular surfaces. The plurality of fastening elements may secure the first and second mounting flanges to respective ones of the first and second bearing surfaces of at least some of the plurality of spacing elements.

In some examples, methods of assembling sight glasses into pipe assemblies, where the sight glasses include a first annular surface, a second annular surface parallel to and spaced a first distance from the first annular surface, and a plurality of holes extending through the sight glass from the first annular surface to the second annular surface, may include providing a first pipe section, providing a second pipe section, inserting a spacing element in one of the plurality of holes, and arranging the first and second pipe sections and the sight glass. The first pipe section may include a first mounting flange, and the second pipe section may include a second mounting flange. The spacing element may include a first bearing surface and a second bearing surface parallel to and spaced a second distance from the first bearing surface. The second distance may be at least as large as the first distance. The first and second pipe sections and the sight glass may be arranged with the first and second mounting flanges proximate respective ones of the first and second annular surfaces. The methods may further include inserting a first gasket between the first mounting flange and the first annular surface; inserting a second gasket between the second mounting flange and the second annular surface; inserting a fastening element through the first mounting flange, one of the holes through the sight glass, and the second mounting flange; and tightening the fastening element. Tightening the fastening element may compress the first gasket between the first mounting flange and the first annular surface, compress the second gasket between the second mounting flange and the second annular surface, and secure the first and second mounting flanges to respective ones of the first and second bearing surfaces of at least some of the plurality of spacing elements.

DETAILED DESCRIPTION

Figure 1:
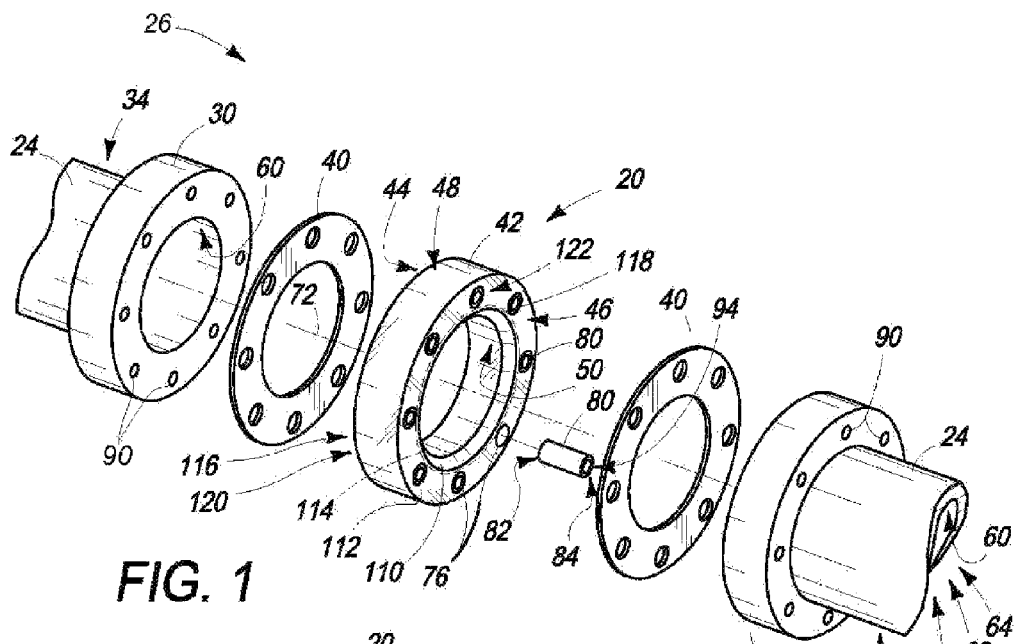
FIG. 1 is a perspective view of a nonexclusive illustrative example of a sight glass assembly interposed between two pipe sections.
Figure 2:
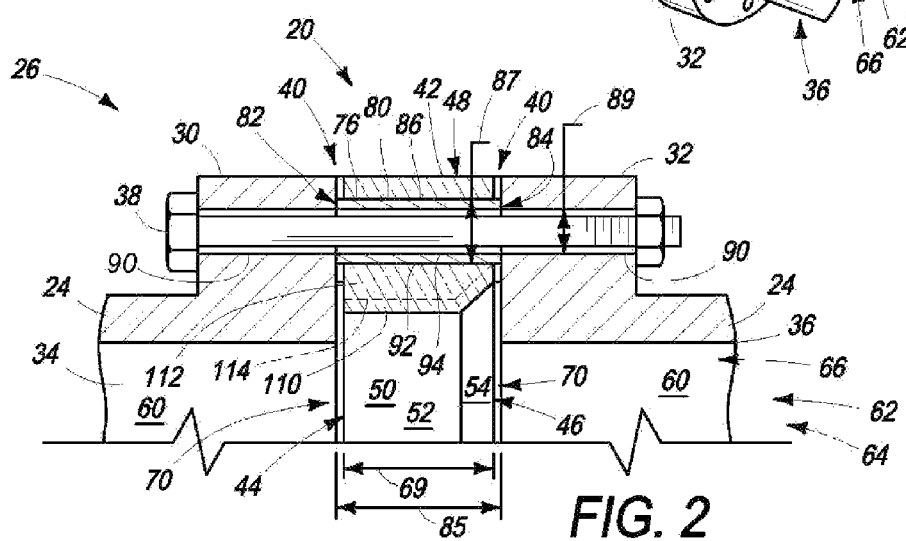
FIG. 2 is a partial longitudinal section view of the sight glass assembly of FIG. 1 assembled between the two pipe sections.

A nonexclusive illustrative example of a sight glass assembly is shown generally at 20 in FIGS. 1 and 2. Unless otherwise specified, sight glass assembly 20 may, but is not required to, contain at least one of the structure, components, functionality, and/or variations described, illustrated, and/or incorporated herein. The sight glass assembly 20 may be mounted or disposed between a pair of suitably configured adjacent pipe sections 24 to form at least a portion of a fluid transport tube or pipe assembly 26. For example and as will be more fully discussed below, the sight glass assembly 20 may be configured for mounting between the first and second pipe flanges 30, 32 of opposed first and second pipe sections 34, 36. As shown in FIGS. 1 and 2, the sight glass assembly 20 may be configured for mounting between first and second pipe flanges 30, 32 that extend radially from the first and second pipe sections 34, 36 and are secured together and against the sight glass assembly 20 by a plurality of axially extending fastening elements 38, which may be in the form of threaded fasteners or bolts. The sight glass assembly 20 may be configured for mounting between any suitably configured first and second pipe flanges 30, 32, such as pipe flanges configured as described in R.P. No. 28 of the Truck Trailer Manufacturers Association (TTMA) of Alexandria, Va., the complete disclosure of which is incorporated by reference for all purposes. In some nonexclusive illustrative examples, the pipe assembly 26 may include suitable gaskets 40, which may be disposed between one or both of the first and second pipe flanges 30, 32 and the sight glass assembly 20, as shown in FIGS. 1 and 2.

As shown in FIGS. 1 and 2, the sight glass assembly 20 may include an annular or ring-shaped body 42 of a suitable transparent material, which may itself be solid. By "annular" or "ring-shaped," it is meant that body 42 extends around a closed-loop path, which may be at least partially circular, elliptical, polygonal, symmetric, and/or asymmetric, where the width of the body as it extends around the closed-loop path may be uniform or it may be variable. Nonexclusive illustrative example of suitable transparent materials may include any suitable transparent engineering material such as a glass or a plastic. A suitable material may be one that exhibits an appropriate combination of mechanical, thermal, and/or optical properties such as strength, transparency, and/or optical clarity. A nonexclusive illustrative example of a suitable material is an acrylic, which may be extruded as a large tube and cut to length or cast into a final or near final shape. In some nonexclusive illustrative examples, some or all of the surfaces of the body 42 may be polished for enhanced optical performance of the sight glass assembly 20.

The body 42, which may itself be a solid body, may include first and second annular surfaces 44, 46, a peripheral surface 48, and an interior surface 50. These surfaces may collectively define the exterior of the body 42. These "surfaces" need not be planar and/or smoothly curved. Rather, each of these "surfaces" may include two or more distinct surfaces, which may smoothly and/or abruptly meet and/or intersect such that the surface may be at least partially faceted. For example, as shown in the nonexclusive illustrative example presented in FIGS. 1 and 2, the interior surface 50 may include a cylindrical portion 52 and a flared or chamfered portion 54.

The interior surface 50, which may extend between the first and second annular surfaces 44, 46, may define at least a portion of a fluid path. For example, as shown in FIG. 2, the interior surface 50 of the body 42 and the interior surfaces 60 of the first and second pipe sections 34, 36 may collectively define at least a portion of a fluid path 62 through the pipe assembly 26. In some nonexclusive illustrative examples, at least a portion of the interior surface 50, such as the flared or chamfered portion 54, may be configured to provide clearance for a component 64 that may be disposed at least partially within the interior 66 of one of the pipe sections 24. By way of a nonexclusive illustrative example, component 64 may be the plate of a butterfly valve that might be disposed in the pipe assembly 26 proximate the sight glass assembly 20. In such an example, the flared or chamfered portion 54 may be sized to clear the swinging plate of the butterfly valve.

As shown in the nonexclusive illustrative example presented in FIGS. 1 and 2, the first and second annular surfaces 44, 46 may provide mounting surfaces on the body 42. Thus, the first and second annular surfaces 44, 46 may be substantially planar and parallel, with the second annular surface 46 being spaced a first distance 69 from the first annular surface 44. In some nonexclusive illustrative examples, at least one of the first and second annular surfaces 44, 46 may define an axial end 70 of the body 42. Further, although the first and second annular surfaces 44, 46 are perpendicular to an axis 72 of the pipe assembly 26 in the nonexclusive illustrative example presented in FIGS. 1 and 2, it is within the scope of this disclosure for at least one of the first and second annular surfaces 44, 46 to be obliquely oriented relative to the axis 72.

The body 42 may include at least one passage 76 extending from the first annular surface 44 to the second annular surface 46. In some nonexclusive illustrative examples, at least a part of at least some of the passages 76 may be disposed between the peripheral and interior surfaces 48, 50 or the body 42. For example, as shown in FIGS. 1 and 2, the passages 76 may be in the form of apertures or holes extending or passing through the body 42. However, in some nonexclusive illustrative examples, some or all of the passages may be configured as indentations, slots, or grooves in the peripheral surface 48 or the interior surface 50, where at least a part of the passage may be disposed beyond the peripheral or interior surface of the body 42. Further, as shown in the nonexclusive illustrative example presented in FIGS. 1 and 2, the passages 76 may be parallel to a longitudinal axis of the body 42, which may correspond to the axis 72 of the pipe assembly 26.

At least one of the plurality of fasting elements 38 may pass through at least one of the passages 76 such that the sight glass assembly 20 may be secured to the pipe assembly 26. More particularly, as shown in FIG. 2, the fastening elements 38 may secure the first and second mounting flanges 30, 32 proximate respective ones of the first and second annular surfaces 44, 46.

In some nonexclusive illustrative examples, the sight glass assembly 20 may include at least one spacing element 80. Each of the spacing elements 80 may have a first bearing surface 82 and a second bearing surface 84. The second bearing surface 84 may be parallel to the first bearing surface 82. At least one spacing element 80 may be disposed within at least one of the passages 76, such that the spacing element 80 extends along the passage 76 from the first bearing surface 82 to the second bearing surface 84. Disposing a spacing element 80 within one of the passages 76, which may be disposed between the peripheral and interior surfaces 48, 50, may permit use of a body 42 that is relatively thicker in a radial direction between the peripheral and interior surfaces 48, 50 for a given pattern of holes or passages when compared to a body that fits between the peripheral or interior surface and the passages 76 and/or the spacing element 80. Such a given pattern of holes or passages may include a pattern configured for use with a particular pipe flange, such as a TTMA pipe flange as discussed above. Use of a body 42 that is relatively thicker in the radial direction may allow relatively higher pressures in the fluid path 62. The second bearing surface 84 may be spaced a second distance 85 from the first bearing surface 82. The second distance 85 may be greater than or at least as large as the first distance 69 such that the spacing elements are as long as, or longer than, the body 42 is thick. The second distance 85 may be the same or substantially the same for some or all of the spacing elements 80.

In such an example, when the fastening elements 38 are used to secure the first and second pipe sections 34, 36 to each other and to the sight glass assembly 20, the fastening elements 38 secure the first and second mounting flanges 30, 32 to respective ones of the first and second bearing surfaces 82, 84 of at least some of the plurality of spacing elements 80. However, as shown in the example presented in FIG. 2, even though the first and second mounting 30, 32 flanges are secured proximate respective ones of the first and second annular surfaces 44, 46 of the body 42, the first and second mounting 30, 32 flanges may remain spaced from the first and second annular surfaces 44, 46 because the spacing elements 80 are longer than the body 42 is thick. Any resulting gaps 88 between the annular surfaces of the body 42 and the mounting flanges of the pipe sections 24 may be filled and/or sealed at least partially with the gaskets 40, which may be disposed between the first annular surface 44 and the first mounting flange 30 and/or between the second annular surface 46 and the second mounting flange 32.

The use of spacing elements 80 that are as long as, or longer than, the body 42 is thick may permit or cause the transfer of some or all of any compressive or clamp loads induced by the fastening elements 38 from the body 42 to the spacing elements 80. In particular, if the spacing elements 80 are not present in the pipe assembly 26, any compressive or clamp loads induced by the fastening elements 38 would be induced in the first and second mounting flanges 30, 32 as well as in the body 42. If the compressive or clamp loads induced in the body 42 become excessive, such as due to excessive or improper tightening of the fastening elements, such as by improper torquing or tightening of nuts, the body 42 may fail, such as by cracking. However, if the spacing elements 80 are as long as, or longer than, the body 42 is thick, the fastening elements 38 may tend to urge the first and second mounting flanges 30, 32 against the bearing surfaces of the spacing elements rather than against the annular surfaces of the body 42. In such an example, the spacing elements 80 may carry at least a portion, or even most or all, of the compressive or clamp loads induced by the fastening elements 38. Thus, any excessive compressive or clamp loads that may be induced due to over and/or improper tightening of the fastening elements 38 may be transferred partially or entirely to the spacing elements 38, which may reduce or prevent cracking or other damage in the body 42. Further, suitably pliable and/or soft gaskets 40 may be used to limit or cushion any compressive stresses that may be induced into the body 42 if the gaskets are compressed between respective ones of the first and second mounting flanges 30, 32 and the first and second annular surfaces 44, 46 when the mounting flanges are urged against the bearing surfaces of the spacing elements.

The use of appropriate gaskets 40 and spacing elements 80 that are as long as, or are longer than, the body 42 is thick may at least partially separate or distinguish the liquid-carrying integrity of the pipe assembly 26 from its structural integrity. The liquid-carrying integrity of the pipe assembly 26 may be a function of the integrity of the fluid path 62, at least a portion of which may be defined by interior surface 50 of the body 42, the interior surfaces 60 of the first and second pipe sections 34, 36, and the gaskets 40. In contrast, the structural integrity of the pipe assembly 26 may at least partially depend on the mechanical connection between the first and second pipe sections 34, 36, which may depend on a load path passing from the first mounting flange 30, through the spacing element 80, and to the second mounting flange 32. Thus, the structural integrity of the pipe assembly 26 may at least partially depend on appropriately high compression or clamp loads being induced in the first and second mounting flanges 30, 32 and the spacing element 80. In contrast, the liquid-carrying integrity of the pipe assembly 26 may merely require that the body 42 sufficiently engage the first and second mounting flanges 30, 32 and/or the gaskets 40 such that a fluid proof seal may be maintained. Thus, a combination of appropriate gaskets 40 and spacing elements 80 that are as long as, or longer than, the body 42 is thick may permit compression or clamp loads in the pipe flanges and spacing elements that are high enough for a desirable level of structural integrity while limiting the compression or clamp loads on the body 42 to a level sufficient to provide the sealing necessary to maintain the liquid-carrying integrity of the pipe assembly 26, which may minimize or even eliminate damage or cracking in the sight glass assembly 20.

In addition to, or as an alternative to, being longer than the body 42 is thick, the spacing elements 80 may include a material that is more resistant to compression than, or has a compressive stiffness greater than the compressive stiffness of, the transparent material used for the body. For example, as discussed above, the body 42 may be fabricated from an acrylic material, and the spacing elements 80 may be fabricated from a metal, such as steel, which has a greater compressive stiffness than acrylic. Spacing elements 80 that are more resistant to compression than the body 42 may carry a greater portion of the compressive or clamp load than the relatively less stiff body 42.

In some nonexclusive illustrative examples, the spacing elements 80 may include and/or be in the form of a cylindrical body or cylinder 86 that extends from the first bearing surface 82 to the second bearing surface 84. For example, as shown in FIG. 1, the spacing elements 80 may be a right-circular-cylindrical body, which may be closely or slip fit into one of the holes or passages 76 through the body 42. A slip-fit between the spacing elements 80 and the holes or passages 76 may provide for radial retention of the body 42 relative to at least one of the first and second mounting flanges 30, 32. Further, as may be seen in FIGS. 1 and 2, the outer diameter 87 of the spacing element 80 or the cylinder 86 may be larger than the diameter 89 of the fastener or bolt holes 90 in the first and second mounting flanges 30, 32 such that the bearing surfaces 82, 84 of the spacing elements may bear against the mounting flanges of the pipe sections. In some nonexclusive illustrative examples, the diameter 89 of the fastener or bolt holes 90 in the first and second mounting flanges 30, 32 may be a standard or preexisting size such that the sight glass assembly may be used with unmodified or preexisting mounting flanges. In addition to being circular or round, it is also within the scope of the present disclosure for the spacing elements 80 and/or the cylinders 86 to have other than a circular cross-section. For example, the cylinder 86 may be at least partially elliptical and/or polygonal. However, at least one radial or cross-sectional dimension of the spacing elements 80 or cylinders 86 may be larger than the diameter of the fastener or bolt holes 90 in the first and second mounting flanges 30, 32.

As shown in the nonexclusive illustrative example presented in FIGS. 1 and 2, the spacing elements 80 may be in the form of or include a tube 92 having a passage 94, with the tube 92 and passage 94 extending from the first bearing surface 82 to the second bearing surface 84. In some examples, the tube 92 may be configured to have a close or slip-fit into one or more of the holes or passages 76 through the body 42. The passage 94 may be configured to have a close or slip-fit around one of the fastening elements 38. Such close or slip fits may assist with radially retaining the body 42, as discussed above.

Figure 3:
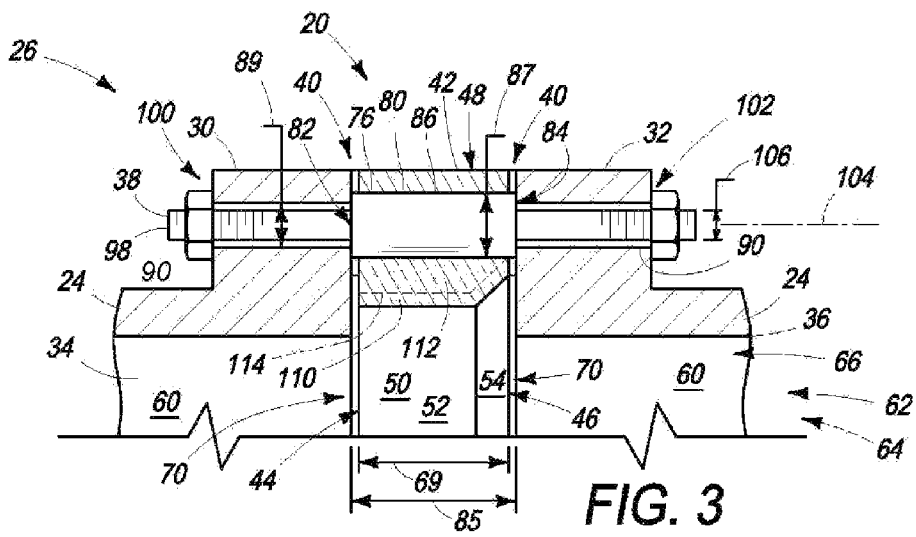
FIG. 3 is a partial longitudinal section view of another nonexclusive illustrative example of a sight glass assembly assembled between two pipe sections.

In some nonexclusive illustrative examples, a spacing element 80 may be incorporated into at least some of the fastening elements 38. For example, as shown in FIG. 3, the fastening elements 38 may be in the form of shoulder studs 98. The shoulder studs 98 may include a cylindrical portion or cylinder 86 having a outer diameter 87 and first and second regions 100, 102 that extend from respective ones of the first and second bearing surfaces 82, 84 of the cylinder 86 along an axis 104 of the cylinder 86. As shown in FIG. 3, the first and second regions 100, 102, which may be threaded along at least a portion of their length, may have a diameter, such as a nominal or outside diameter 106, that is smaller than the outer diameter 87 of the cylindrical portion.

In some nonexclusive illustrative examples, at least a portion of at least some of the surfaces of the body 42 may be chemically resistant to a predetermined liquid that may pass through the fluid path 62 of the pipe assembly 26. Nonexclusive illustrative examples of predetermined fluids to which the surfaces may be chemically resistant may include liquid fuels such as petroleum-containing fuels, ethanol-containing fuels, and/or methanol-containing fuels. By "chemically resistant," it is meant that damage and/or deterioration to the interior surface 50 is prevented, reduced or delayed. Such damage and/or deterioration may include erosion, reduction in mechanical or thermal properties, such as strength or temperature resistance, and deterioration in transparency and/or optical clarity, such as due to etching, hazing, clouding, or discoloration. Although the chemically resistant portions of the body 42 may be limited to at least a portion of at least some of the surfaces of the body 42, it is within the scope of the present disclosure for at least a portion of the body 42, beyond or within one or more of the surfaces of the body 42, to be chemically resistant to the predetermined liquid, For example, the interior surface 50 and/or an interior layer or region 110 of the body 42 may include a material that is chemically resistant to a predetermined liquid. As suggested in FIGS. 1-3, the interior region 110 of the body 42 may be bounded by an intermediate surface 114 that is disposed between the interior and peripheral surfaces 48, 50, a first or inner annular portion 116 of the first annular surface 44, a second or inner annular portion 118 of the second annular surface 46, and the interior surface 50. The intermediate surface 114 may be disposed between at least some of the passages 76 and the interior surface 50, as shown in FIGS. 1-3, it may intersect one of more of the passages 76, and/or it may be disposed between at least some of the passages 76 and the peripheral surface 48. Use of a chemically resistant interior layer or region 110 may permit use of a material that is less or not chemically resistant, such as an acrylic, in an exterior region 112 while limiting or preventing degradation to that material. As suggested in FIGS. 1-3, the exterior region 112 of the body 42 may be bounded by the peripheral surface 48, a third or outer annular portion 120 of the first annular surface 44, a fourth or outer annular portion 122 of the second annular surface 46, and the intermediate surface 114.

Figure 4:
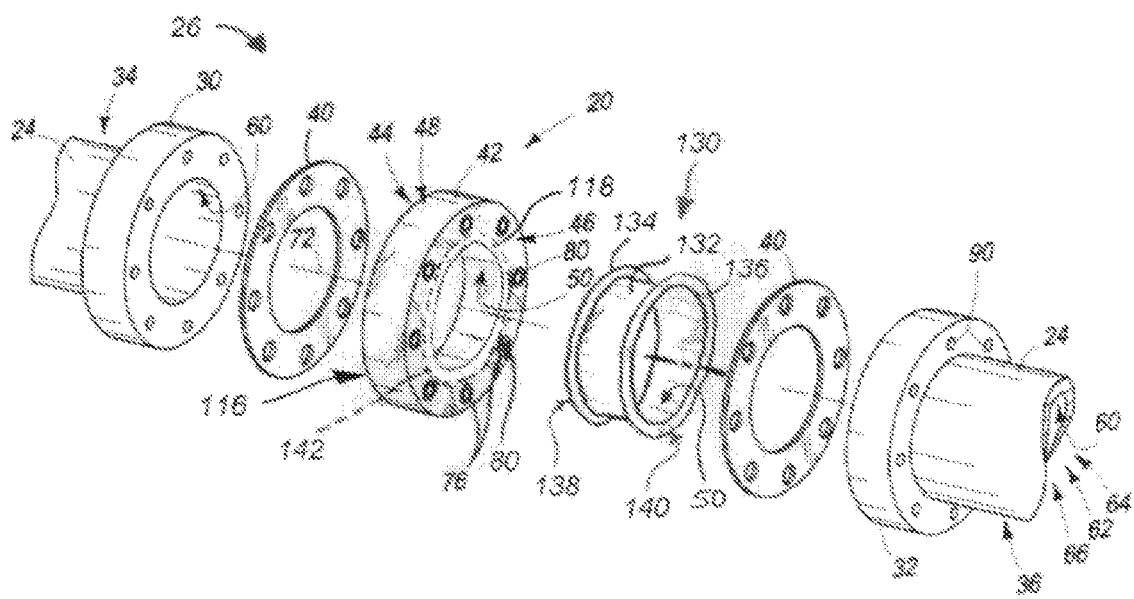
FIG. 4 is a perspective view of another nonexclusive illustrative example of a sight glass assembly, such as the sight glass assembly of FIG. 1, that includes a chemically resistant liner and is interposed between two pipe sections.

In some nonexclusive illustrative examples, the surfaces of the interior region may be chemically resistant to the predetermined fluid. For example, a layer of chemically resistant material may cover the interior surface 50 and the inner annular portions 116, 118 of the first and second annular surfaces 44, 46. The layer of chemically resistant material covering the interior surface 50 and the inner annular portions 116, 118 of the first and second annular surfaces 44, 46 may be in the form of a liner, such as the liner 130 shown in FIG. 4. The liner 130 may be sufficiently flexible such that it may be removable from the sight glass assembly, such as for repair and/or replacement. By "removable," it is meant that, even though the retaining component is capable of optionally permanently retaining the retained component, the retained component may optionally be repeatedly retained by and/or removed from the retaining component without permanent and/or destructive alteration to the retaining component, the retained component, and/or the engagement therebetween. As shown in FIG. 4, the liner 130 may include a first or central portion 132, a second portion 134 and a third portion 136. The first or central portion 132 may be configured to provide a layer of chemically resistant material configured to form the interior surface 50. The second and third portions 134, 136 may provide first and second radially-extending flanges 138, 142. The first radially-extending flange 138 may be configured to extend along the first annular surface 44 from the interior surface 50 toward the peripheral surface 48, and the second radially-extending flange 140 may be configured to extend along the second annular surface 46 from the interior surface 50 toward the peripheral surface 48. One or both of the first and second radially-extending flanges 138, 140 may extend wholly from the interior surface 50 to the peripheral surface 48, or as is suggested in FIG. 4, may extend to an intermediate region 142 of the annular surface.

Nonexclusive illustrative examples of suitable chemically resistant materials, which may be chemically resistant to one or more of the liquid fuels discussed above and may have a desirable level of transparency such that the body 42 remains sufficiently transparent, may include a suitable polymer, such as high-density polyethylene (HDPE) or fluorinated ethylene propylene, or a suitable glass. A suitable fluorinated ethylene propylene may include those sold by DuPont under the Teflon® FEP brand. A suitable glass may include a borosilicate glass such as that sold by the Corning Corp. of Corning, New York under the Pyrex® brand. In some examples, the interior layer or region 110 of the body 42, which may be fabricated from a chemically resistant material, may be in the form of a surface treatment or coating that may be sprayed or otherwise deposited onto the interior surface 50 of the body 42. For example, a layer of high-density polyethylene or fluorinated ethylene propylene may be sprayed or otherwise deposited onto the interior surface, or may be fabricated into a liner 130 as discussed above. In some examples, such as where the interior layer or region 110 of the body 42 is a borosilicate glass, the interior region 110 may be preformed and the exterior region 112, which may be a transparent acrylic, may be integrally cast onto the interior region 110.

A nonexclusive illustrative example of a method of assembling a sight glass, such as the sight glass assembly 20, into a pipe assembly, such as the pipe assembly 26, may include providing a first pipe section 34 having a first mounting flange 30, providing a second pipe section 36 having a second mounting flange 32, inserting a spacing element 80 in one of the plurality of holes or passages 76, arranging the first and second pipe sections 34, 36 and the sight glass assembly 20 with the first and second mounting flanges 30, 32 proximate respective ones of the first and second annular surfaces 44, 46, inserting a first gasket 40 between the first mounting flange 30 and the first annular surface 44, and inserting a second gasket 40 between the second mounting flange 32 and the second annular surface 46. The method may further include inserting a fastening element 38 through the first mounting flange 30, one of the holes or passages 76 through the sight glass assembly 20, and the second mounting flange 32. In some examples, the fastening element 38 may be inserted through the spacing element 80, such as through the passage 94. The method may further include tightening the fastening element 38 to compress the first gasket 40 between the first mounting flange 30 and the first annular surface 44, compress the second gasket 40 between the second mounting flange 32 and the second annular surface 46, and secure the first and second mounting flanges 30, 32 to respective ones of the first and second bearing surfaces 82, 84 of at least some of the plurality of spacing elements 80.

In some nonexclusive illustrative examples, the method may further include securing the spacing element 80, such as with a flexible member, such as a nylon monofilament line, in the one of the plurality of holes or passages 76 prior to arranging the first and second pipe sections 34, 36 and the sight glass assembly 20 with the first and second mounting flanges 30, 32 proximate respective ones of the first and second annular surfaces 44, 46.

In some nonexclusive illustrative examples, the method may further include arranging a liner 130 and the sight glass assembly 20 such that the liner 130 provides the sight glass assembly 20 with a chemically resistant interior surface 50. The liner 130 may include, or be formed at least partially from, a material that is chemically resistant to a liquid fuel selected from the group consisting of petroleum-containing fuels, ethanol-containing fuels, and methanol-containing fuels.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A sight glass assembly, comprising:
an annular body of a transparent material, the annular body comprising:
a peripheral surface,
an interior surface defining at least a portion of a fluid path,
a first planar annular surface,
a second planar annular surface parallel to and spaced a first distance from the first planar annular surface, and
at least three passages extending through the annular body from the first planar annular surface to the second planar annular surface, wherein at least a part of each of the passages is disposed between the peripheral surface and the interior surface; and
at least three spacing elements disposed in at least three of the passages, wherein each of the spacing elements extends along one of the passages from a first bearing surface to a second bearing surface, the first bearing surface is spaced a second distance from the second bearing surface, the second distance is at least as large as the first distance, and the spacing elements comprise a material having a compressive stiffness greater than the compressive stiffness of the transparent material.

2. The sight glass assembly of claim 1, wherein at least one of the spacing elements comprises a cylinder extending from the first bearing surface to the second bearing surface.

3. The sight glass assembly of claim 2, wherein at least one of the passages is a hole, the cylinder is a tube extending from the first bearing surface to the second bearing surface, and the tube is configured for a slip-fit in the hole.

4. The sight glass assembly of claim 3, wherein:
the transparent material comprises an acrylic and the material having a compressive stiffness greater than the compressive stiffness of the transparent material is metal;
the tube is configured to receive a bolt extending therethrough;
the tube has a first solid cross-sectional area in a plane corresponding to one of the first and second bearing surfaces, and the bolt has a second solid cross-sectional area in the plane corresponding to one of the first and second bearing surfaces; and
the first solid cross-sectional area is larger than the second solid cross-sectional area.

5. The sight glass assembly of claim 2, wherein the cylinder has a first diameter and an axis, first and second at least partially threaded regions extend along the axis from respective ones of the first and second bearing surfaces, the first and second threaded regions have a second diameter, and the second diameter is smaller than the first diameter.

6. The sight glass assembly of claim 2, wherein the transparent material comprises an acrylic and the material having a compressive stiffness greater than the compressive stiffness of the transparent material is metal.

7. A method of assembling a sight glass into a pipe assembly, the sight glass being formed of a transparent material and comprising a first annular surface, a second annular surface parallel to and spaced a first distance from the first annular surface, and a plurality of holes extending through the sight glass from the first annular surface to the second annular surface, the method comprising the following actions, but not necessarily in the order recited:
providing a first pipe section having a first mounting flange;
providing a second pipe section having a second mounting flange;

inserting at least three spacing elements in the plurality of holes, the spacing elements each having a first bearing surface and a second bearing surface parallel to and spaced a second distance from the first bearing surface, wherein the second distance is at least as large as the first distance, wherein the spacing elements comprise a material having a compressive stiffness greater than the compressive stiffness of the transparent material, and the spacing elements have a first solid cross-sectional area in a plane corresponding to one of the first and second bearing surfaces;

arranging the first and second pipe sections and the sight glass with the first and second mounting flanges proximate respective ones of the first and second annular surfaces;

inserting a first gasket between the first mounting flange and the first annular surface;

inserting a second gasket between the second mounting flange and the second annular surface;

inserting a fastening element through the first mounting flange, one of the holes through the sight glass, and the second mounting flange, wherein the fastening element has a second solid cross-sectional area in the plane corresponding to one of the first and second bearing surfaces, and the first solid cross-sectional area is larger than the second solid cross-sectional area; and tightening the fastening element to compress the first gasket between the first mounting flange and the first annular surface, compress the second gasket between the second mounting flange and the second annular surface, and secure the first and second mounting flanges to respective ones of the first and second bearing surfaces of the at least three spacing elements.

8. The method of claim 7, further comprising securing the spacing elements in the holes prior to arranging the first and second pipe sections and the sight glass with the first and second mounting flanges proximate respective ones of the first and second annular surfaces.

9. The method of claim 7, wherein inserting a fastening element through the first mounting flange, one of the holes through the sight glass, and the second mounting flange further comprises inserting the fastening element through one of the spacing elements.

10. The method of claim 9, wherein the transparent material comprises an acrylic and the material having a compressive stiffness greater than the compressive stiffness of the transparent material is metal.

11. A pipe assembly, comprising:
a first pipe section having a first mounting flange;
a second pipe section having a second mounting flange;
at least three spacing elements, each of which has a first bearing surface and a second bearing surface parallel to and spaced a first distance from the first bearing surface;
a plurality of fastening elements, wherein the plurality of fastening elements secure the first and second mounting flanges to respective ones of the first and second bearing surfaces of the at least three spacing elements, wherein structural loads within the pipe assembly pass between the first and second pipe sections, and wherein the first and second mounting flanges, the spacing elements and the fastening elements carry the structural loads between the first and second pipe sections; and
a ring-shaped body of a transparent material disposed between the first and second mounting flanges, the ring-shaped body comprising:
first and second annular surfaces, wherein the second annular surface is parallel to and spaced a second distance from the first annular surface, and the first distance is at least as large as the second distance, and
a plurality of holes extending through the ring-shaped body from the first annular surface to the second annular surface and parallel to a longitudinal axis of the ring-shaped body;
wherein at least one of the spacing elements is disposed in and extends through at least one of the plurality of holes, at least one of the fastening elements extends through one of the plurality of holes, the first and second annular surfaces are disposed proximate respective ones of the first and second mounting flanges, the spacing elements comprise a material having a compressive stiffness greater than the compressive stiffness of the transparent material, and the ring-shaped body is isolated from at least a portion of the compressive structural loads between the first and second pipe sections.

12. The pipe assembly of claim 11, further comprising first and second gaskets, wherein the first gasket is disposed between the first mounting flange and the first annular surface, and the second gasket is disposed between the second mounting flange and the second annular surface.

13. The pipe assembly of claim 11, wherein at least some of the spacing elements comprise a cylinder extending from the first bearing surface to the second bearing surface, and the cylinder is configured for a slip-fit in one of the plurality of holes.

14. The pipe assembly of claim 11, wherein at least some of the plurality of fastening elements comprise one of the spacing elements.

15. The pipe assembly of claim 11, wherein the ring-shaped body comprises at least three holes extending through the ring-shaped body from the first annular surface to the second annular surface and parallel to a longitudinal axis of the ring-shaped body, each of the at least three spacing elements is disposed in and extends through one of the holes, and each of the fastening elements extends through one of the holes.

16. The pipe assembly of claim 11, wherein at least a first one of the spacing elements includes a cylindrical passage extending therethrough from the first bearing surface to the second bearing surface, and one of the fastening elements extends through the cylindrical passage.

17. The pipe assembly of claim 16, wherein:
compressive loads exist between the first and second mounting flanges;
a first portion of the compressive loads passes through the at least three spacing elements;
a second portion of the compressive loads passes through the ring-shaped body and induces compressive stresses therein; and
the at least three spacing elements are configured to prevent inducing compressive stresses in the ring-shaped body that are high enough to cause cracking of the ring shaped body.

18. The pipe assembly of claim 17, wherein substantially all of the compressive loads pass through the at least three spacing elements.

19. The pipe assembly of claim 16, wherein:
the transparent material comprises an acrylic and the material having a compressive stiffness greater than the compressive stiffness of the transparent material is metal;
the first one of the spacing elements has a first solid cross-sectional area in a plane corresponding to one of the first and second bearing surfaces;
the fastening element extending through the cylindrical passage of the first one of the spacing elements has a second solid cross-sectional area in the plane corresponding to one of the first and second bearing surfaces; and the first solid cross-sectional area is larger than the second solid cross-sectional area.

20. The pipe assembly of claim 19, wherein compressive loads exist between the first and second mounting flanges, a first portion of the compressive loads passes through the at least three spacing elements, a second portion of the compressive loads passes through the ring-shaped body, and the first portion of the compressive loads is larger than the second portion of the compressive loads.

21. The pipe assembly of claim 11, wherein each of the spacing elements includes a cylindrical passage extending therethrough from the first bearing surface to the second bearing surface, each of the spacing elements is disposed in and extends through one of the plurality of holes extending through the ring-shaped body, and each of the plurality of fastening elements is disposed in and extends through the cylindrical passage of one of the spacing elements.

22. A pipe assembly, comprising:
a first pipe section having a first mounting flange;
a second pipe section having a second mounting flange;
at least three spacing elements, wherein each spacing element includes a first bearing surface, a second bearing surface parallel to and spaced a first distance from the first bearing surface, and a cylindrical passage extending therethrough from the first bearing surface to the second bearing surface, and each of the spacing elements has a first solid cross-sectional area in a plane corresponding to one of the first and second bearing surfaces;
at least three fastening elements, wherein each of the fastening elements is disposed in and extends through the cylindrical passage through one of the spacing elements, the at least three fastening elements secure the first and second mounting flanges to respective ones of the first and second bearing surfaces of the at least three spacing elements, and structural loads within the pipe assembly pass between the first and second pipe section, wherein the first and second mounting flanges, the spacing elements and the fastening elements carry the structural loads between the first and second pipe sections, each of the fastening elements has a second solid cross-sectional area in the plane corresponding to one of the first and second bearing surfaces, and the first solid cross-sectional area is larger than the second solid cross-sectional area; and a ring-shaped body of a transparent material disposed between the first and second mounting flanges, the ring-shaped body comprising:
first and second annular surfaces, wherein the second annular surface is parallel to and spaced a second distance from the first annular surface, and the first distance is at least as large as the second distance, and
at least three holes extending through the ring-shaped body from the first annular surface to the second annular surface and parallel to a longitudinal axis of the ring-shaped body;
wherein each of the at least three spacing elements is disposed in and extends through one of the at least three holes, the first and second annular surfaces are disposed proximate respective ones of the first and second mounting flanges, the spacing elements comprise a material having a compressive stiffness greater than the compressive stiffness of the transparent material, and the ring-shaped body is isolated from at least a portion of the structural loads between the first and second pipe sections.

23. The pipe assembly of claim 22, wherein compressive loads exist between the first and second mounting flanges, a first portion of the compressive loads passes through the at least three spacing elements, a second portion of the compressive loads passes through the ring-shaped body, and the first portion of the compressive loads is larger than the second portion of the compressive loads.

24. The pipe assembly of claim 22, wherein the transparent material comprises an acrylic and the material having a compressive stiffness greater than the compressive stiffness of the transparent material is metal.

* * * * *